United States Patent
Moulsley et al.

(10) Patent No.: US 9,801,168 B2
(45) Date of Patent: Oct. 24, 2017

(54) WIRELESS COMMUNICATION WITH CO-OPERATING CELLS

(71) Applicant: FUJITSU LIMITED, Kawasaki-shi, Kanagawa (JP)

(72) Inventors: Timothy Moulsley, Caterham (GB); Zhaojun Li, Guildford (GB); Paul Bucknell, Brighton (GB); Chenxi Zhu, Palo Alto, CA (US)

(73) Assignee: FUJITSU LIMITED, Kawasaki (JP)

( * ) Notice: Subject to any disclaimer, the term of this patent is extended or adjusted under 35 U.S.C. 154(b) by 152 days.

(21) Appl. No.: 13/927,603

(22) Filed: Jun. 26, 2013

(65) Prior Publication Data

US 2014/0161056 A1 Jun. 12, 2014

Related U.S. Application Data

(63) Continuation of application No. PCT/EP2011/051500, filed on Feb. 2, 2011.

(51) Int. Cl.
*H04W 72/04* (2009.01)
*H04B 7/024* (2017.01)

(52) U.S. Cl.
CPC .......... *H04W 72/042* (2013.01); *H04B 7/024* (2013.01)

(58) Field of Classification Search
CPC ..... H04B 7/024; H04L 5/0035; H04L 5/0048; H04L 5/009; H04L 25/0224; H04W 52/325; H04W 52/40; H04J 11/0053
See application file for complete search history.

(56) References Cited

U.S. PATENT DOCUMENTS

| 8,521,215 | B2* | 8/2013 | Hirakawa | H04B 7/024 342/463 |
| 2009/0185650 | A1* | 7/2009 | Ravid | H04B 7/0617 375/376 |
| 2010/0027454 | A1 | 2/2010 | Hou et al. | |
| 2010/0254268 | A1* | 10/2010 | Kim | H04W 36/385 370/241 |
| 2010/0317343 | A1* | 12/2010 | Krishnamurthy | G01S 1/30 455/435.1 |

(Continued)

FOREIGN PATENT DOCUMENTS

| EP | 2343942 | 7/2011 |
| JP | 2010-14967 A | 1/2010 |
| JP | 2011-4161 A | 1/2011 |

(Continued)

OTHER PUBLICATIONS

Notice of Reason(s) for Rejection issued for corresponding Japanese Patent Application No. 2013-552112 mailed on Dec. 24, 2014 with an English translation.
Office Action issued for corresponding Korean Patent Application No. 10-2013-7018649, mailed on Jun. 26, 2014, with an English translation.

(Continued)

*Primary Examiner* — David Oveissi
(74) *Attorney, Agent, or Firm* — Myers Wolin, LLC

(57) ABSTRACT

A wireless communication method in which a user equipment receives downlink signals from at least first and second cells, said downlink signals include respective reference signals transmitted from each of the cells; and a channel jointly transmitted by the cells; the user equipment utilizing a joint amplitude and/or phase reference derived from the respective reference signals to demodulate the jointly transmitted channel.

16 Claims, 10 Drawing Sheets

(56) References Cited

U.S. PATENT DOCUMENTS

2011/0098054 A1* 4/2011 Gorokhov .............. H04B 7/024
                                                       455/452.1

FOREIGN PATENT DOCUMENTS

| JP | 2012-515472 A | 7/2012 |
|----|---------------|--------|
| WO | 2010/032791 A1 | 3/2010 |
| WO | 2010/081166 A2 | 7/2010 |
| WO | 2010101404 | 9/2010 |
| WO | 2010/122818 A1 | 10/2010 |
| WO | 2010/124241 A2 | 10/2010 |
| WO | 2010/125738 A1 | 11/2010 |
| WO | 2010146781 | 12/2010 |

OTHER PUBLICATIONS

International search report and written opinion issued for corresponding International Patent Application No. PCT/EP2011/051500, mailed Oct. 7, 2011.

Samsung; "Issues on DL RS Design for Higher Order MIMO"; Agenda Item: 11.3; 3GPP TSG RAN WG1 #55; R1-084169; Prague, Czech Republic; Nov. 10-14, 2008.

3GPP TR 36.814 V0.4.1; 3rd Generation Partnership Project; Technical Specification Group Radio Access Network; "Further Advancements for E-UTRA Physical Layer Aspects (Release 9)": Feb. 2009.

First Notification of Office Action issued by the State Intellectual Property Office of China for corresponding Chinese Patent Application No. 201180066743.3, dated Jun. 1, 2015, with an English translation.

* cited by examiner

REs and REGs

WIRELESS COMMUNICATION WITH CO-OPERATING CELLS

CROSS-REFERENCE TO RELATED APPLICATIONS

This application is a continuation of International Application PCT/EP2011/051500, filed on Feb. 2, 2011, and designating the U.S., the entire contents of which are herein incorporated by reference.

FIELD OF THE INVENTION

The present invention relates to wireless communication systems, for example systems based on the 3GPP Long Term Evolution (LTE) and 3GPP LTE-A groups of standards.

BACKGROUND

Wireless communication systems are widely known in which base stations (BSs) communicate with user equipments (UEs) (also called subscriber or mobile stations) within range of the BSs.

The geographical area covered by a base station is generally referred to as a cell, and typically many BSs are provided in appropriate locations so as to form a network covering a wide geographical area more or less seamlessly with adjacent and/or overlapping cells. (In this specification, the terms "system" and "network" are used synonymously). In more advanced systems, the concept of a cell can also be used in a different way: for example to define a set of radio resources (such as a given bandwidth around a carrier centre frequency), with an associated identity which may be used to distinguish one cell from another. The cell identity can be used for example in determining some of the transmission properties of communication channels associated with the cell, such as using scrambling codes, spreading codes and hopping sequences. A cell may also be associated with one or more reference signals (see below), which are intended to provide amplitude and/or phase reference(s) for receiving one or more communication channels associated with the cell. Therefore, it is possible to refer to communication channels associated with a cell being transmitted from or by the cell (in the downlink), or transmitted to a cell (in the uplink), even if the transmission or reception is actually carried out by a base station. Typically, in an FDD system, a downlink cell is linked or associated with a corresponding uplink cell. However, it should be noted that it would in principle be possible to organise a communication system which has cell-like features without explicit cells being defined. For example, an explicit cell identity may not be needed in all cases.

Each BS divides its available bandwidth, i.e. frequency and time resources in a given cell, into individual resource allocations for the user equipments which it serves. The user equipments are generally mobile and therefore may move among the cells, prompting a need for handovers of radio communication links between the base stations of adjacent cells. A user equipment may be in range of (i.e. able to detect signals from) several cells at the same time, but in the simplest case it communicates with one "serving" cell. For some purposes a BS may also be described as an "access point" or a "transmission point".

Modern wireless communication systems such as LTE and LTE-A are hugely complex and a full description of their operation is beyond the scope of this specification. However, for assisting understanding of the inventive concepts to be described later, some outline will be given of some of the features of LTE which are of particular relevance in the present invention.

OFDM and OFDMA

OFDM (Orthogonal Frequency Division Multiplexing) is one known technique for transmitting data in a wireless communication system. An OFDM-based communications scheme divides data symbols to be transmitted among a large number of subcarriers, hence the term frequency division multiplexing. Data is modulated onto a subcarrier by adjusting its phase, amplitude, or both phase and amplitude. The "orthogonal" part of the name OFDM refers to the fact that the spacings of the subcarriers in the frequency domain are specially chosen so as to be orthogonal, in a mathematical sense, to the other subcarriers. In other words, they are arranged along the frequency axis such that the sidebands of adjacent subcarriers are allowed to overlap but can still be received without inter-subcarrier interference. As the user equipments will receive the same signals at slightly different timings, in other words with a certain delay spread, each OFDM symbol is preceded by a cyclic prefix (CP), which is used to effectively eliminate inter-symbol interference. Further, OFDM enables broadcast services on a synchronized single frequency network with appropriate cyclic prefix design (see below). This allows broadcast signals from different cells to combine over the air, thus significantly increasing the received signal power and supportable data rates for broadcast services.

When individual subcarriers or sets of subcarriers are assigned to different user equipments, the result is a multi-access system referred to as OFDMA (Orthogonal Frequency Division Multiple Access), as used in LTE and LTE-A for the downlink—in other words for communication from base stations to user equipments. By assigning distinct frequency/time resources to each user equipment in a cell, OFDMA can substantially avoid interference among the users served within a given cell.

In OFDMA, users (called UEs in LTE) are allocated a specific number of subcarriers for a predetermined amount of time. An amount of resource consisting of a set number of subcarriers and OFDM symbols is referred to as a resource block (RB) in LTE. RBs thus have both a time and frequency dimension. Allocation of RBs is handled by a scheduling function at the base station (an eNodeB in an LTE-based system).

In LTE, each eNodeB may have a plurality of antennas, and may serve multiple cells at the same frequency simultaneously. One eNodeB may be considered to comprise one or more BSs. Moreover, there may be distinct uplink and downlink cells (in the remainder of this specification, the term "cell" can be assumed to mean at least a downlink cell). Incidentally, the wireless network is referred to as the "E-UTRAN" (Evolved UMTS Terrestrial Radio Access Network) in LTE. The eNodeBs are connected to each other, and to higher-level nodes, by a backhaul network, e.g. the core network or Evolved Packet Core (EPC).

Frame Structure and Resource Blocks

In a wireless communication system such as LTE, data for transmission on the downlink is organised in OFDMA frames each divided into a number of sub-frames. Various frame types are possible and differ between FDD and TDD for example. Frames follow successively one immediately after the other, and each is given a system frame number (SFN).

FIG. 1 shows a generic frame structure for LTE, applicable to the downlink, in which the 10 ms frame is divided into 20 equally sized slots of 0.5 ms. A sub-frame SF consists of two consecutive slots, so one radio frame contains 10 sub-frames.

The available downlink bandwidth consists of $N_{BW}$ sub-carriers with a spacing of f=15 kHz. In case of multi cell MBMS transmission (see later), a sub-carrier spacing of f=7.5 kHz is also possible. $N_{BW}$ can vary in order to allow for scalable system bandwidth operation up to 20 MHz.

FIG. 2 shows a so-called downlink resource grid for the duration of one downlink slot. One downlink slot consists of Nsymb OFDM symbols in general. To each symbol, the above-mentioned cyclic prefix (CP) is appended as a guard time, as shown in FIG. 1.

Nsymb depends on the cyclic prefix length. The generic frame structure with normal cyclic prefix length contains Nsymb=7 symbols as illustrated in FIG. 2. Additionally, an extended CP is defined in order to cover large cell scenarios with higher delay spread, and for MBMS transmission (see below).

The transmitted signal in each slot is described by a resource grid of sub-carriers and available OFDM symbols, as shown in FIG. 2. Each element in the resource grid is called a resource element (RE) and each resource element corresponds to one symbol.

OFDMA allows the access by multiple UEs to the available bandwidth as already mentioned. Each UE is assigned a specific time-frequency resource. The data channels are shared channels, i.e. for each transmission time interval of 1 ms, a new scheduling decision is taken regarding which UEs are assigned to which time/frequency resources during this transmission time interval. The basic scheduling unit for allocation of resources to the UEs is called a resource block (RB). As shown in FIG. 2, one resource block is defined as 7 consecutive OFDM symbols in the time domain (or 6 with extended CP) and 12 consecutive sub-carriers in the frequency domain. In one OFDM symbol, the number of subcarriers can be one of 128, 256, 512, 1024, 1536, and 2048. The resource block size is the same for all system bandwidths, therefore the number of available physical resource blocks depends on the bandwidth.

Several resource blocks may be allocated to the same UE, and these resource blocks do not have to be adjacent to each other. Scheduling decisions are taken at the base station (eNodeB). The scheduling algorithm has to take into account the radio link quality situation of different UEs, the overall interference situation, Quality of Service requirements, service priorities, etc.

Reference Signals

To facilitate measurements of the radio link properties by UEs, and reception of some transmission channels, reference signals are embedded in the downlink sub-frame as transmitted from each antenna of an eNodeB or more correctly, "antenna port". The term "antenna port" is preferred when referring to transmissions from multiple antennas, since it is possible for multiple physical antennas to transmit copies of the same signal and thus act as a single antenna port.

In case of two transmit antenna ports in LTE, therefore, reference signals are transmitted from each antenna port. The reference signals on the second antenna are offset in the frequency domain by three sub-carriers, and to allow the UEs to accurately measure the radio link properties, nothing is transmitted on the other antenna at the same time-frequency location of reference signals.

The reference signals provide an amplitude and/or phase reference for allowing the UEs to correctly decode the remainder of the downlink transmission. In LTE (as distinct from LTE-A), reference signals can be classified into a cell-specific (or common) reference signal (CRS), an MBSFN reference signal used in MBMS, and a user equipment-specific reference signal (UE-specific RS).

The CRS is transmitted to all the UEs within a cell and used for channel estimation. The reference signal sequence, which spans the entire downlink cell bandwidth, depends on, or implicitly carries, the cell identity or "cell ID". As a cell may be served by an eNodeB having more than one antenna port, respective CRS are provided for each antenna port and the locations of CRSs depend on the antennal port. The number and location of CRSs depends not only on the number of antenna ports but also on which type of CP is in use.

The MBSFN reference signal can be transmitted in sub-frames allocated for MBSFN transmission (see below).

A UE-specific reference signal is received by a specific UE or a specific UE group within a cell. UE-specific reference signals are chiefly used by a specific UE or a specific UE group for the purpose of data demodulation.

CRSs are transmitted in all downlink sub-frames in a cell supporting non-MBSFN transmission. If a sub-frame is used for transmission with MBSFN, only the first few (0, 1 or 2) OFDM symbols in a sub-frame can be used for transmission of cell-specific reference symbols.

CRSs can be accessed by all the UEs within the cell covered by the eNodeB regardless of the specific time/frequency resource allocated to the UEs. They are used by UEs to measure properties of the radio channel—so-called channel state information or CSI—with respect to such parameters as a Channel Quality Indicator, CQI.

LTE-A (LTE-Advanced) introduces further reference signals including a Channel State Information reference signal CSI-RS, and a UE-specific demodulation reference signal DM-RS, not to be confused with demodulation reference signals transmitted on the uplink by the UEs. These additional signals have particular application to beamforming and MIMO transmission techniques outlined below.

Resource Element Groups (REGs)

Resource Element groups (REGs) are blocks of consecutive REs within the same OFDM symbol. They are used to define the mapping of control channels (see below) to resource elements. Within each sub-frame, the REGs are located in the first few (usually four) symbols and have the same pattern in every sub-frame.

FIG. 3 shows the relationship between REGs and the REs in the first four symbols of one RB. In FIG. 3 and the subsequent Figures, the symbols are arranged along the horizontal axis and the subcarriers are arranged along the vertical axis. Here, only the first few symbols are shown for simplicity; however, it will be understood that each sub-frame actually contains ten slots each with Nsymb symbols as shown in FIG. 2.

Each REG is represented by an index pair (k', l') where k' is the subcarrier index (numbered starting with 0 in this example) of the "first" RE within the REG, and l' is the symbol index (again starting from 0) of the REG. In FIGS. 3, A, B, C, and D each denote REs allocated to a respective REG. As is clear from the Figure, each REG contains four REs.

More specifically, each REG contains four REs which are not already occupied by a CRS, as shown in FIGS. 4 and 5, where FIG. 4 illustrates the case of a normal CP and FIG. 5, the extended CP, both assuming the case of a one- or two-antenna port configuration. As shown here, all REs within the first four symbols are allocated to a REG; thus the boundaries of the REGs are dependent on where the CRS are located.

More particularly, as shown in FIG. 4 for example, CRSs are present within the first symbol (numbered with index 0). As each REG requires four unoccupied REs, the twelve REs in the first symbol of one RB form two REGs. In the second and third symbols (index 1 and 2) no CRS is present (in this antenna port configuration) so that each symbol can contain three REGs.

In the case of a four (or more) antenna port configuration, the arrangement is similar except that the CRS will now extend into the second symbol, so that only two REGs per RB are available in that symbol.

When the extended CP is used, only 12 symbols (instead of 14) are contained in each sub-frame. The effect of this is that CRSs need to be located in the fourth symbol as well as in the first symbol. In FIG. 5, the effect on RE allocation to REGs is shown. The difference is that now only two REGs per RB may be defined in the fourth symbol.

Channels

Several channels for data and control signalling are defined at various levels of abstraction within the network. FIG. 6 shows some of the channels defined in LTE at each of a logical level, transport layer level and physical layer level, and the mappings between them. For present purposes, the channels at the physical layer level are of most interest.

On the downlink, user data is carried on the Physical Downlink Shared Channel (PDSCH). There are various control channels on the downlink, which carry signalling for various purposes including so-called Radio Resource Control (RRC), a protocol used as part of the above-mentioned RRM. In particular the Physical Downlink Control Channel, PDCCH (see below).

Meanwhile, on the uplink, user data and also some signalling data is carried on the Physical Uplink Shared Channel (PUSCH), and control channels include a Physical Uplink Control Channel, PUCCH, used to carry signalling from UEs including channel quality indication (CQI) reports, precoding matrix information (PMI), a rank indication for MIMO (see below), and scheduling requests.

PDCCH, PCFICH and PHICH

Three control channels of particular interest in the present invention are PDDCH, PCFICH and PHICH.

PDCCH is used to carry scheduling information—called downlink control information, DCI—from base stations (called eNodeBs in LTE) to individual UEs. The PDCCH is located in the first few OFDM symbols of a slot as explained below. More particularly PDCCH contains:

the resource allocations for the downlink transport channel DL-SCH shown in FIG. 6
  Transmit Power Control (TPC) commands for PUCCH and the uplink transport channel UL-SCH in FIG. 6; these commands enable the UE to adjust its transmit power to save battery usage
  Hybrid-Automatic Repeat Request (HARQ) setup information
  MIMO (see below) precoding information.

A cyclic redundancy check (CRC) is used for error detection of the DCI. The entire PDCCH payload is used to calculate a set of CRC parity bits, which are then appended to the end of the PDCCH payload.

As multiple PDCCHs relevant to different UEs can be present in one sub-frame, the CRC is also used to specify which UE a PDCCH is relevant to. This is done by scrambling the CRC parity bits with a Radio Network Temporary Identifier (RNTI) of the UE. Other identifiers may also be applied.

The size of the DCI depends on a number of factors, and thus it is necessary that the UE is aware of the size of the DCI, either by RRC configuration or by another means to signal the number of symbols occupied by PDCCH.

PCFICH (Physical Control Format Indicator Channel) is used to indicate the number of symbols used in the current sub-frame for the PDCCH transmission. It is always located in the first OFDM symbol of each sub-frame (as initially the size of the downlink control information is unknown). This helps a UE to know where to look for the control information, and indirectly, for user data.

PHICH (Physical Hybrid-ARQ Indicator Channel) carries ACK/NACK for uplink data transmission. That is, the eNodeB sends a HARQ indicator to the UE to indicate a positive acknowledgement (ACK) or negative acknowledgement (NACK) depending on whether it has successfully received data from the UE on the uplink.

Not only the CRSs as outlined above, but also these control channels PDCCH, PCFICH and PHICH, are located within the first few symbols of each sub-frame. One advantage of this is to allow a UE to reduce power consumption by switching off its receiver if it is not scheduled for communication in the remainder of the sub-frame.

Referring to FIG. 7, this shows one example of how the above channels are mapped to REGs/REs within the first few (in this case, three) symbols. As before the horizontal axis represents symbol number (denoted in this case by an index l, numbered from 0) and the vertical axis represents the subcarriers (with index k, again numbered from 0 in this Figure).

Shaded REs are used for reference signals of each of four antenna ports in this example. REs marked C are used for PCFICH, and others marked H allocated to PHICH. REs labelled with numbers denote symbol quadruplets (corresponding to REGs) capable of being assigned for various purposes including PDCCH. The REGs marked by thick black lines are allocated to PDCCH in this example.

The following points are pertinent, as will become clear later:

(a) PDCCH may occupy the first 1, 2, 3 or 4 OFDM symbols in a sub-frame (4 is a special case for small system bandwidths).

(b) A given PDCCH may be transmitted in any one of a number of given locations (that is, a search space comprising a pre-determined subset of all the possible locations). The UE attempts blind decoding of the PDCCH in each location within the search space.

(c) PDCCH mapping to Resource Elements (REs) avoids conflict with CRS, PCFICH and PHICH, for which the locations generally depend on Cell ID and/or configuration.

(d) PCFICH is mapped to a set of REGs depending on Cell ID (PCFICH is only transmitted in the first OFDM symbol as already mentioned; PCFICH is not transmitted in MBSFN cells which do not support PDSCH).

(e) PHICH is mapped to a set of REGs not used for PCFICH, and therefore depends on Cell ID. PHICH starts in the first OFDM symbol; its duration may be 1, 2 or 3 OFDM symbols (thus, FIG. 7 is a simplified example); and PHICH cannot extend into PDSCH region (so the PDCCH duration is at least as great as the PHICH duration).

(f) CRS are used as an amplitude and/or phase reference for reception of PDCCH.

To summarise, the same OFDM symbols are typically shared by PDCCH, CRS, PCFICH, and PHICH. The PDCCH is mapped to resources not used by the other channels.

MIMO

A technique called MIMO, where MIMO stands for multiple-input multiple-output, has been adopted in LTE due to its spectral efficiency gain, spatial diversity gain and antenna gain. One use of the MIMO technique is for so-called transmit (Tx) diversity, where blocks of data intended for the same UE are transmitted via multiple transmitting antenna ports, the signals from which may follow different propagation paths.

"Diversity coding" refers to the process for generating signals for transmission in a transmit diversity system. The antenna ports may be Tx antennas of different eNodeBs or of the same eNodeB. In LTE, owing to limitations on the physical size and capabilities of UEs, transmit diversity is more applicable on the downlink than to the uplink. Only one receiving antenna port (Rx antenna) is needed at the UE, although two or more Rx antennas may be used to improve performance.

Space Time Block Coding (STBC) and Space Frequency Block Coding (SFBC) are common methods of diversity coding. These methods are referred to as "open loop" diversity schemes since the transmitters do not have perfect knowledge of the transmission channel. Briefly, the distinction between these methods is that in STBC, different symbols are transmitted from different antennas at the same time; whereas in SFBC, the space coding is applied across neighbouring subcarriers within the same symbol such that different subcarriers are transmitted from different antennas at the same time.

CoMP and MBMS

Related to the above, it is possible to coordinate the MIMO transmissions among multiple base stations (i.e. coordinating transmissions in adjacent or nearby cells) to reduce inter-cell interference and improve the data rate to a given UE. This is called coordinated multi-point transmission/reception or CoMP, and is a technique being considered for inclusion in LTE-A. Downlink schemes used in CoMP include "Coordinated Scheduling and/or Coordinated Beamforming (CS/CB)" and "Joint Processing/Joint Transmission (JP/JT)". An additional technique which may be employed is aggregation of multiple carriers (CA) to increase the available peak data rate and allow more complete utilisation of available spectrum allocations.

In CS/CB, data to a single UE is transmitted from one transmission point, but decisions regarding user scheduling (i.e. the scheduling of timings for transmissions to respective UEs) and/or beamforming decisions are made with coordination among the cooperating cells (or cell sectors). In other words, scheduling/beamforming decisions are made with coordination between the cells (or cell sectors) participating in the coordinated scheme so as to prevent, as far as possible, a single UE from receiving signals from more than one transmission point.

On the other hand, in JP/JT, data to a single UE is simultaneously transmitted from multiple transmission points to (coherently or non-coherently) improve the received signal quality and/or cancel interference for other UEs. In other words the UE actively communicates in multiple cells and with more than one transmission point at the same time. From the viewpoint of the UE, it makes no difference whether the cells belong to different eNodeBs or to the same eNodeB.

In CA, discrete frequency bands are used at the same time (in other words, aggregated) to serve the same user equipment, allowing services with high bandwidth demands (up to 100 MHz) to be provided. CA is a feature of LTE-A (LTE-Advanced) which allows LTE-A-capable terminals to access several frequency bands simultaneously whilst retaining compatibility with the existing LTE terminals and physical layer. CA may be considered as an complement to JP for achieving coordination among multiple cells, the difference being (loosely speaking) that CA requires coordination in the frequency domain and JP in the spatial domain.

FIG. 8 schematically illustrates the principles of CS/CB and JP downlink transmission schemes respectively, used in CoMP.

Joint Processing (JP) is represented in FIG. 8(a) in which cells A, B and C actively transmit to the UE, while cell D is not transmitting during the transmission interval used by cells A, B and C.

Of less relevance to the present invention, coordinated scheduling and/or coordinated beamforming (CS/CB) is represented in FIG. 8(b) where only cell B actively transmits data to the UE, while the user scheduling/beamforming decisions are made with coordination among cells A, B, C and D so that the co-channel inter-cell interference among the cooperating cells can be reduced or eliminated.

As another example of co-operative transmission among base stations, MBMS (Multimedia Broadcast Multicast Services) may be performed via multi-cell transmission. In case of multi-cell transmission, the cells and content are synchronized to enable for the terminal to combine the received signal from multiple eNodeBs. This concept is also known as a Single Frequency Network. The E-UTRAN can configure which cells are part of an Single Frequency Network for transmission of an MBMS service, so-called MBSFN operation. The MBMS traffic can share the same carrier with the unicast traffic or be sent on a separate carrier. For MBMS traffic, the above-mentioned extended CP is provided, allowing the UEs to combine the transmissions from the different eNodeBs, and in the case of sub-frames carrying MBSFN data, specific MBSFN reference signals are used as already mentioned.

Co-Ordination of Control Signalling Among Cells

In conventional multi-cellular networks, the spectral efficiency of downlink transmission is limited by the inter-cell interference. One approach to this problem is to coordinate the transmissions among multiple cells (which may imply multiple base stations) as already mentioned, in order to mitigate the inter-cell interference. As a result of the coordination (CoMP), the inter-cell interference can be reduced or eliminated among the coordinated cells, resulting in a significant improvement in the coverage of high data rates, the cell-edge throughput and/or system throughput. CoMP techniques may be applied to MIMO transmissions, although that is not a major consideration for the present invention.

Currently in LTE, a single control channel (PDCCH) is transmitted to the UE from one serving cell (the primary cell or Pcell). For a UE at the cell border, the transmissions from the Pcell suffer from increased interference from neighbouring cells operating at the same frequency, and typically a lower effective transmission rate is used to increase robustness to such interference. This may be applied for both data and control channel and can be achieved by lowering the code rate and/or repeating the message. Both approaches require more transmission resources. In the context of PDCCH transmission, the factor by which the resources are increased (in the frequency domain) is referred to as the aggregation level (which may take values of 1, 2, 4 or 8).

For at least some UEs (e.g. at the cell border) it would be beneficial to be able to jointly transmit the same PDCCH message from two cells. This would greatly improve the SINR for such a message and could allow aggregation level 1 to be used instead of 4, for example. In this case, for the same amount of resource, this could allow PDCCHs to be transmitted to 4 UEs instead of 2. However, there are some problems in doing this within the constraints of the current LTE specifications.

Neighbouring cells are typically given different cell IDs, which can be used as a basis for distinguishing transmissions from different cells. For example, data transmissions are scrambled by sequences which depend on the cell ID. The locations of the common reference symbols (CRS) in the frequency domain also depend on the cell ID. In practice neighbouring cells must have different cell IDs. One reason for this is so that the CRS occupy different locations, otherwise channel measurements for the different cells using CRS are not feasible if the OFDM symbols for CRS happen to be aligned in the time domain. The resources used by other channels such as PCFICH and PHICH also depend on the cell ID.

To achieve joint transmission of PDCCH from different cells would require that radio frames are time-aligned, so that the PDCCH regions overlap (in other words, that the frames, or at least sub-frames within a frame, have start and end timings which coincide within some tolerance). This would also mean that the CRS symbols overlap in the time domain, so different cell IDs become essential to allow different locations in the frequency domain. Therefore, the resources required for CRS, PCFICH and PHICH are in principle different between the different cells. Therefore, even with aligned radio frames, in general, different resources are used for two otherwise identical PDCCH messages in different cells.

Embodiments of the invention address the problem of providing common PDCCH resources between two co-operating cells with different cell IDs. An additional desirable feature of any solution is to ensure that any modification to PDCCH transmissions is backwards compatible with existing signals (i.e. the use of "old" PDCCH transmissions is not impacted by the simultaneous use of "new" PDCCH transmissions). However, as will become clear, the present invention is by no means restricted to use with PDCCH or even with control channels in general.

SUMMARY

According to a first aspect of the present invention, there is provided a wireless communication method in which a user equipment receives downlink signals from at least first and second cells, said downlink signals comprising:
respective reference signals transmitted from each of the cells; and
a channel jointly transmitted by the cells;
the user equipment utilising a joint amplitude and/or phase reference derived from the respective reference signals to demodulate the jointly transmitted channel.

As mentioned in the introduction, the term "cell" in this specification is to be interpreted broadly. For example, it is possible to refer to communication channels associated with a cell being transmitted from or by the cell (in the downlink), or transmitted to a cell (in the uplink), even if the transmission or reception is actually carried out by a base station. The term "cell" is intended also to include sub-cells. The cells may be associated with different base stations or with the same base station. The term "base station" itself has a broad meaning and encompasses, for example, an access point or transmission point.

In this method, preferably, the jointly transmitted channel is transmitted by the cells using only resources which would be used in common by both cells if the same channel were to be transmitted individually by both cells.

Typically the wireless communication method will be a frame-based method in which time is divided into frames of predetermined duration, these in turn possibly subdivided into sub-frames. In such a case the reference signals and the jointly transmitted channel may be transmitted in every frame or sub-frame.

The jointly transmitted channel may include at least one control channel or part of a control channel. That is (in each frame or sub-frame) each of the cells may transmit the whole of the jointly transmitted channel; or one cell may transmit the whole channel and the second cell only a part of the channel; or both cells may transmit overlapping parts of the channel such that in combination the whole channel is transmitted.

In a preferred embodiment the method is for use in an LTE-based wireless communication system; in this case the at least one control channel is preferably the Physical Downlink Control Channel PDCCH and/or Physical Hybrid-ARQ Indicator Channel PHICH as defined in LTE.

The jointly transmitted channel may be considered as a downlink signal of a new "cell" formed by the combination of the co-ordinated transmissions of the first and second cells at the same frequency. Thus, each of the respective reference signals is associated with a respective one of the cells, and the combination of the reference signals from more than one cell, defines a new cell. In this case, at least for signalling purposes, each of the cells and the new cell have different cell identities.

Although primarily envisaged for application to control channels such as PDCCH of LTE, the present invention may also be applied to joint transmission of data to the user equipment. Thus, the jointly transmitted channel may be (or may include) a data channel. In LTE this would be PDSCH for example. As for the control channel, it is possible for each of the cells to transmit the whole channel; or one cell may transmit the whole channel and the second cell only a part; or both cells may transmit overlapping parts of the channel such that in combination the whole data channel is transmitted.

In LTE systems for example, base station equipment may be provided with multiple Tx antennas as already mentioned. Thus, the cells may be provided by base station equipment having multiple antenna ports, each antenna port transmitting respective said reference signals.

In any of the above-defined methods, preferably, the downlink signals transmitted from one of the first and second cells are arranged so as to avoid interfering with the reference signals of the other of the first and second cells. That is, in addition to the cells co-operating to find common resources in which to transmit the jointly transmitted channel, the cells may co-operate to avoid interfering with each other in the timing and frequency of reference signals.

Such co-operation is of course easier to achieve when the first and second cells are provided by the same base station equipment. However, the first and second cells may be provided by different base stations, in which case the method further comprises exchanging signalling between the respective base stations to co-ordinate the jointly transmitted channel. There may also be signalling to each base station from a higher node such as a RRM (Radio Resource Management) entity in the system to initiate and control such co-ordination.

In any case it will generally be necessary or at least desirable, prior to transmission of the jointly transmitted channel, to signal to the user equipment information about the jointly transmitted channel. For example, it may be desirable to notify the user equipment of the cell IDs of the first and second cells, the cell ID of any new cell defined by the jointly transmitted channel, information about the respective reference signals in use, and guidance on how to combine the respective reference signals to derive the joint amplitude and/or phase reference.

According to a second aspect of the present invention, there is provided base station equipment for use in any wireless communication method as defined above, and configured to provide at least one of said first and second cells.

Such base station equipment may comprise:
a transmitter for transmitting, to at least one user equipment, downlink signals in at least a first cell;
reference signal inserting means for allocating reference signals for the cell to predetermined time/frequency domain resources within said downlink signals; and
scheduling means for scheduling at least one downlink channel in the first cell in co-operation with a second cell such that co-operative transmission is achieved for at least part of the channel, by arranging time/frequency domain resources which are common between otherwise identical channel messages transmitted from the first and second cells.

According to a third aspect of the present invention, there is provided user equipment for use in any wireless communication method as defined above, configured to derive a joint amplitude and/or phase reference from the respective reference signals to demodulate the jointly transmitted channel.

Such a user equipment may comprise:
reference signal detection means for detecting respective reference signals transmitted from at least first and second cells in a wireless communication system;
reference signal combining means for deriving, from the received reference signals, a joint reference for a jointly transmitted channel; and
demodulating means for demodulating the jointly transmitted channel on the basis of transmissions from both the first and second cells.

Further aspects of the present invention may provide a RRM entity in a wireless communication network for configuring base station equipment and user equipment for performing any of the methods as defined above. A further aspect relates to software for allowing transceiver equipment equipped with a processor to provide base station equipment or user equipment as defined above. Such software may be recorded on a computer-readable medium.

Thus, embodiments of the present invention can allow two co-operating cells to provide a jointly transmitted channel, for example allowing joint transmission of PDCCH, and providing at least one suitable amplitude and/or phase reference for demodulation of such a joint channel. This may be considered equivalent to creating a new cell from the two co-operating cells.

In general, and unless there is a clear intention to the contrary, features described with respect to one aspect of the invention may be applied equally and in any combination to any other aspect, even if such a combination is not explicitly mentioned or described herein.

As is evident from the foregoing, the present invention involves signal transmissions between cells and user equipments in a wireless communication system. The cells are associated with one or more base stations. A base station may take any form suitable for transmitting and receiving such signals. It is envisaged that the base stations will typically take the form proposed for implementation in the 3GPP LTE and 3GPP LTE-A groups of standards, and may therefore be described as an eNodeB (eNB) (which term also embraces Home eNodeB or Home eNodeB) as appropriate in different situations. However, subject to the functional requirements of the invention, some or all base stations may take any other form suitable for transmitting and receiving signals from user equipments.

Similarly, in the present invention, each user equipment may take any form suitable for transmitting and receiving signals from base stations. For example, the user equipment may take the form of a subscriber station (SS), or a mobile station (MS), or any other suitable fixed-position or movable form. For the purpose of visualising the invention, it may be convenient to imagine the user equipment as a mobile handset (and in many instances at least some of the user equipments will comprise mobile handsets), however no limitation whatsoever is to be implied from this.

BRIEF DESCRIPTION OF THE DRAWINGS

Reference is made, by way of example only, to the accompanying drawings in which.

DETAILED DESCRIPTION

Figure 1:
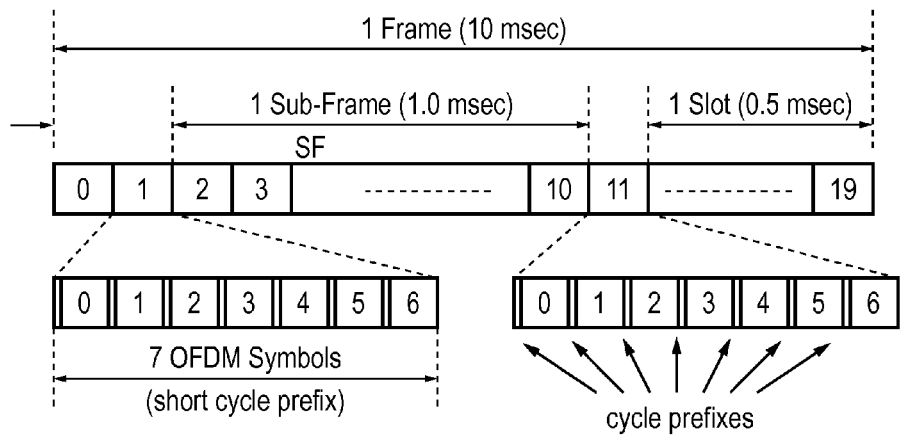
FIG. 1 illustrates a generic frame structure employed for the downlink in an LTE wireless communication system.
Figure 2:
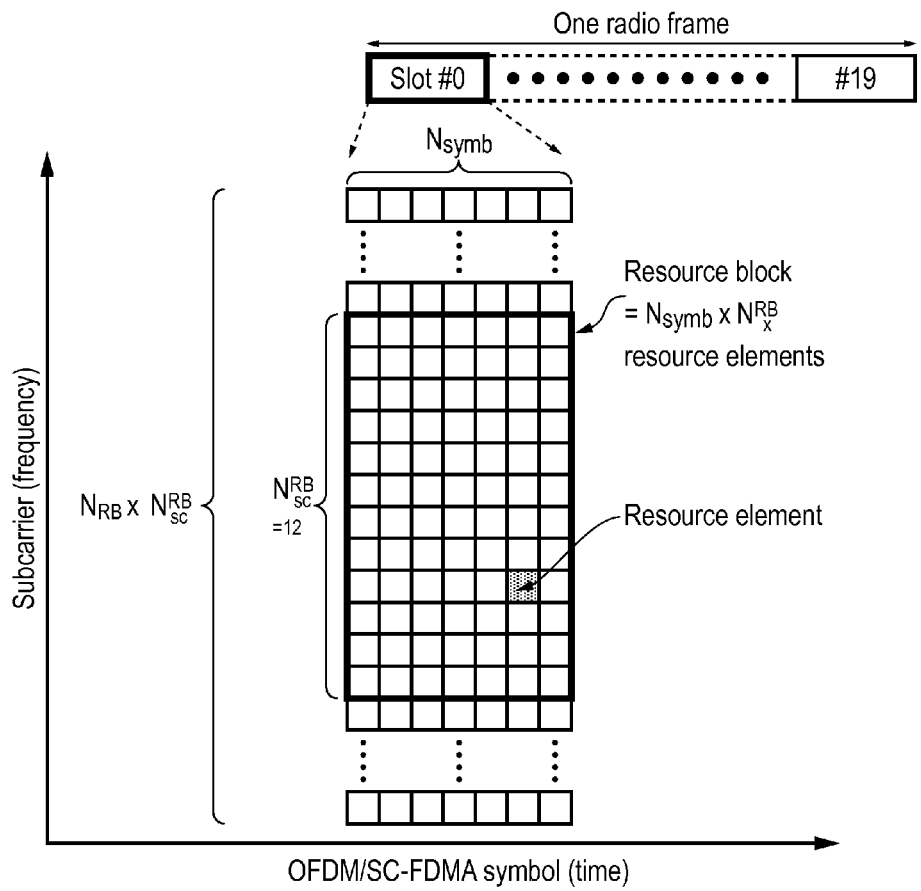
FIG. 2 illustrates resource allocation within a frame.
Figure 3:
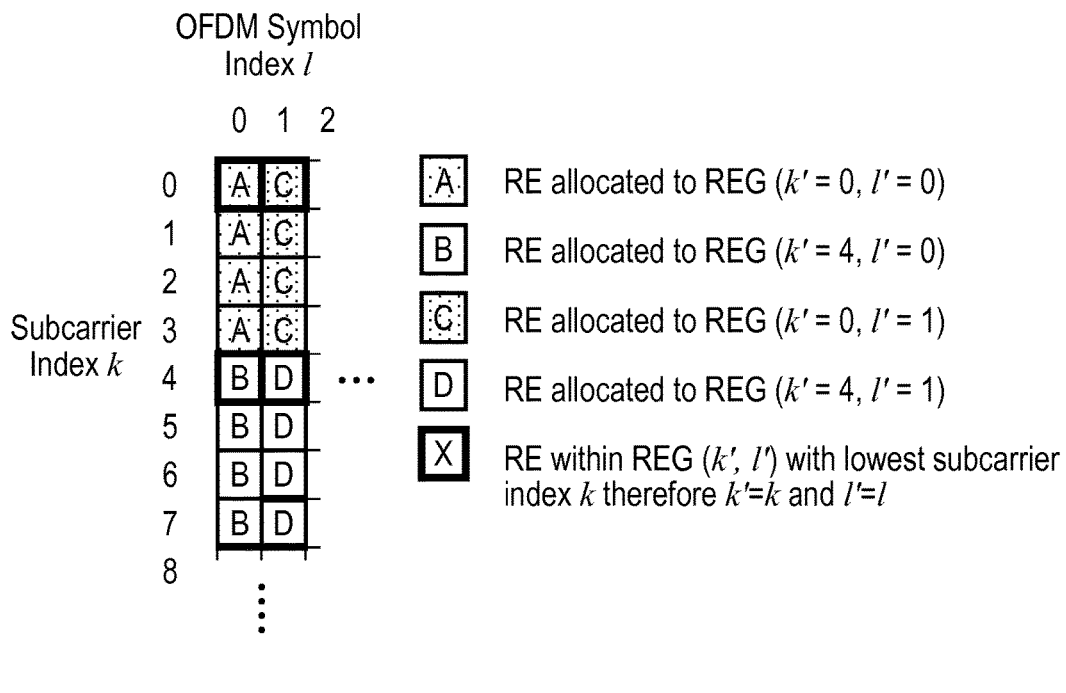
FIG. 3 illustrates Resource Elements (REs) and Resource Element Groups (REGs)
Figure 4:
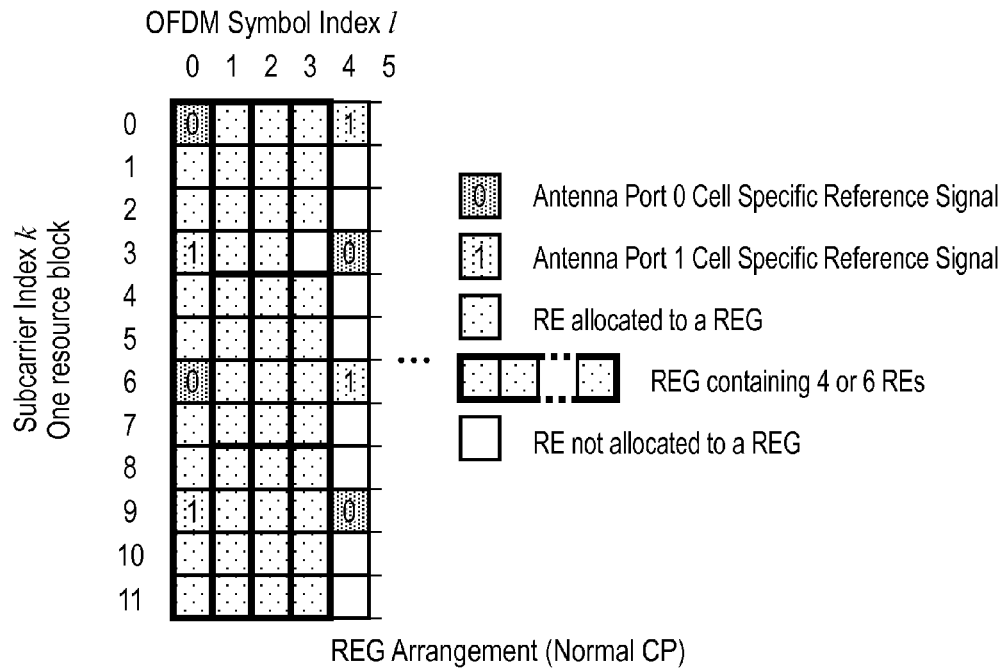
FIG. 4 illustrates placement of REGs in the case of a normal cyclic prefix (CP)
Figure 5:
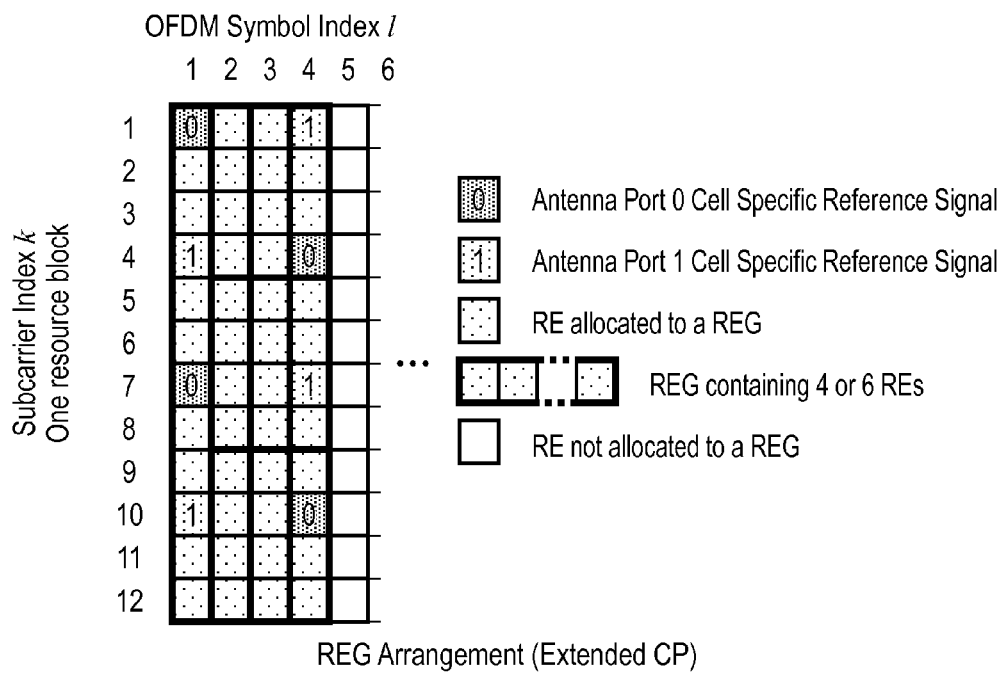
FIG. 5 illustrates placement of REGs in the case of an extended prefix (CP)
Figure 6:
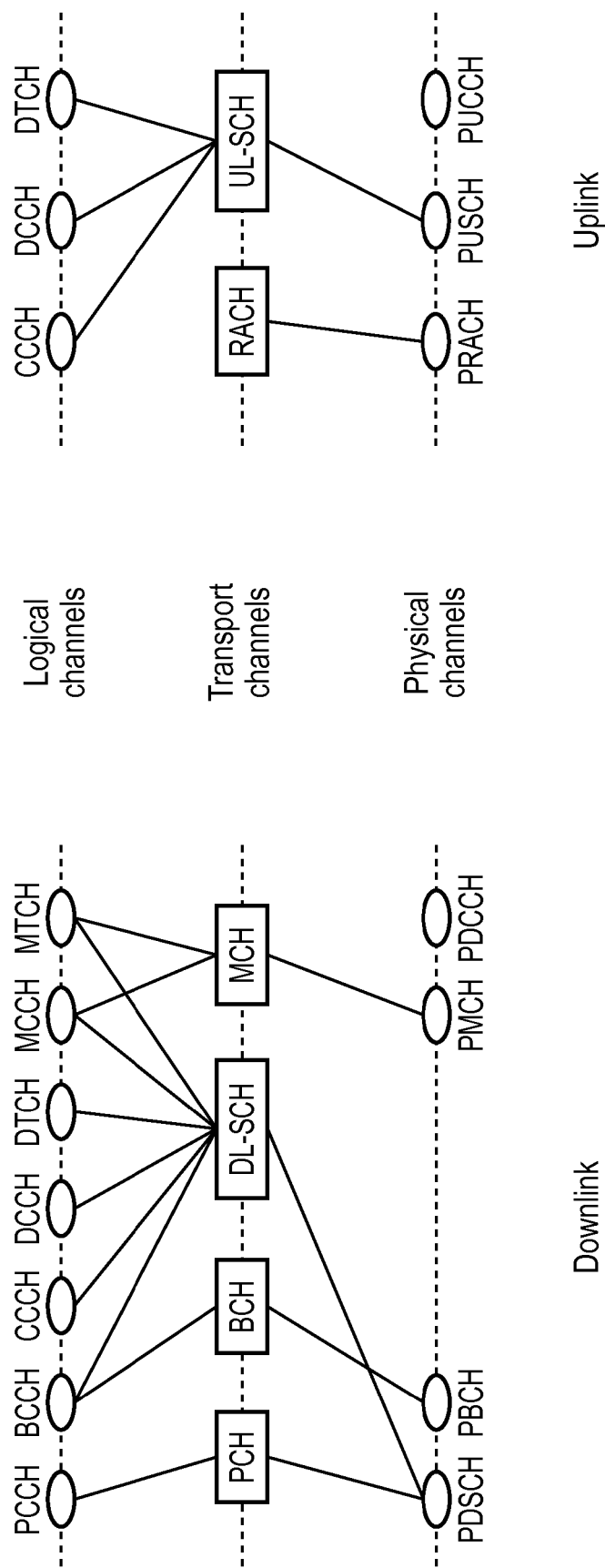
FIG. 6 shows relationships between various channels defined in LTE.
Figure 7:
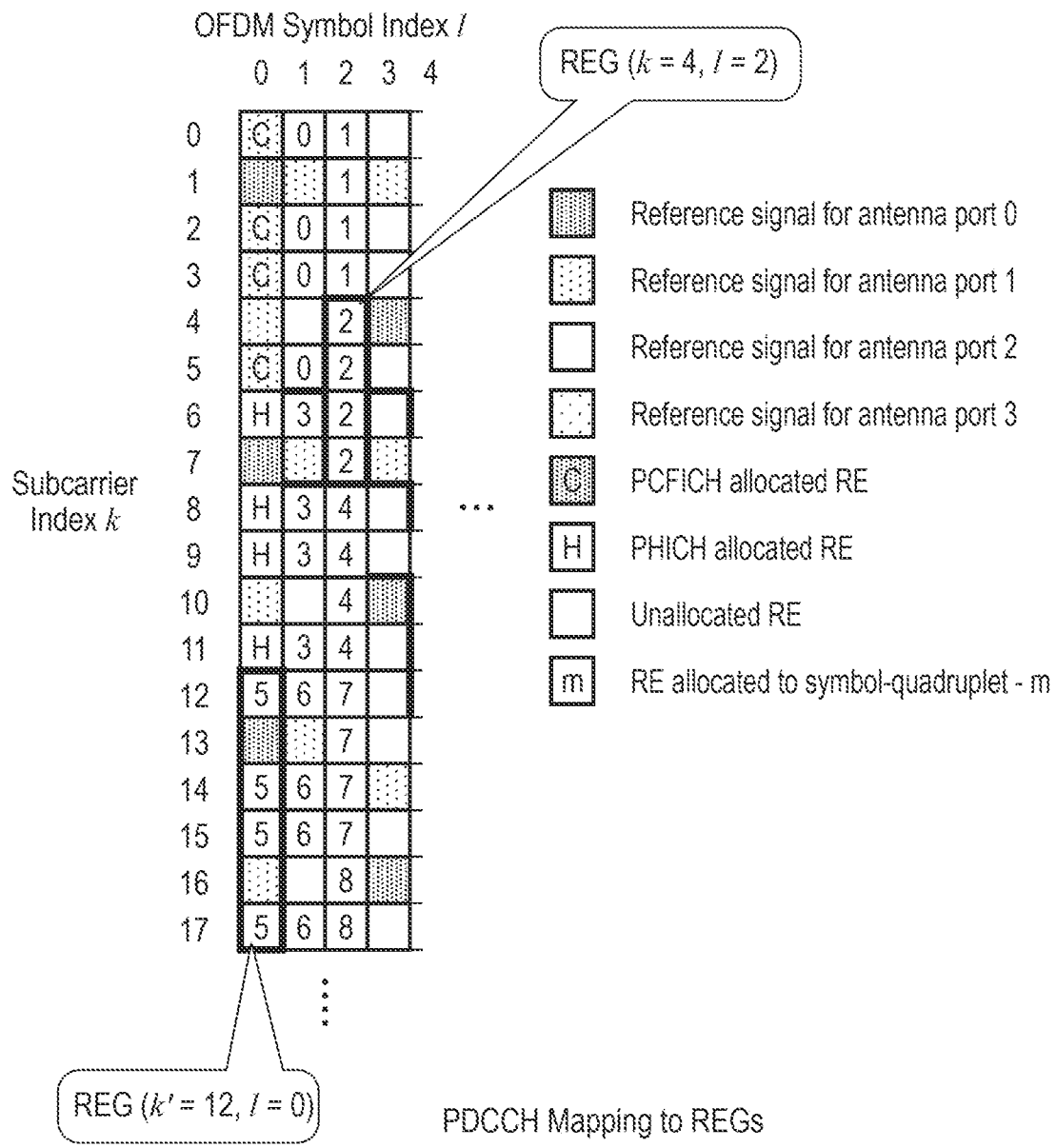
FIG. 7 shows how a control channel PDCCH is mapped to REGs.
Figure 8:
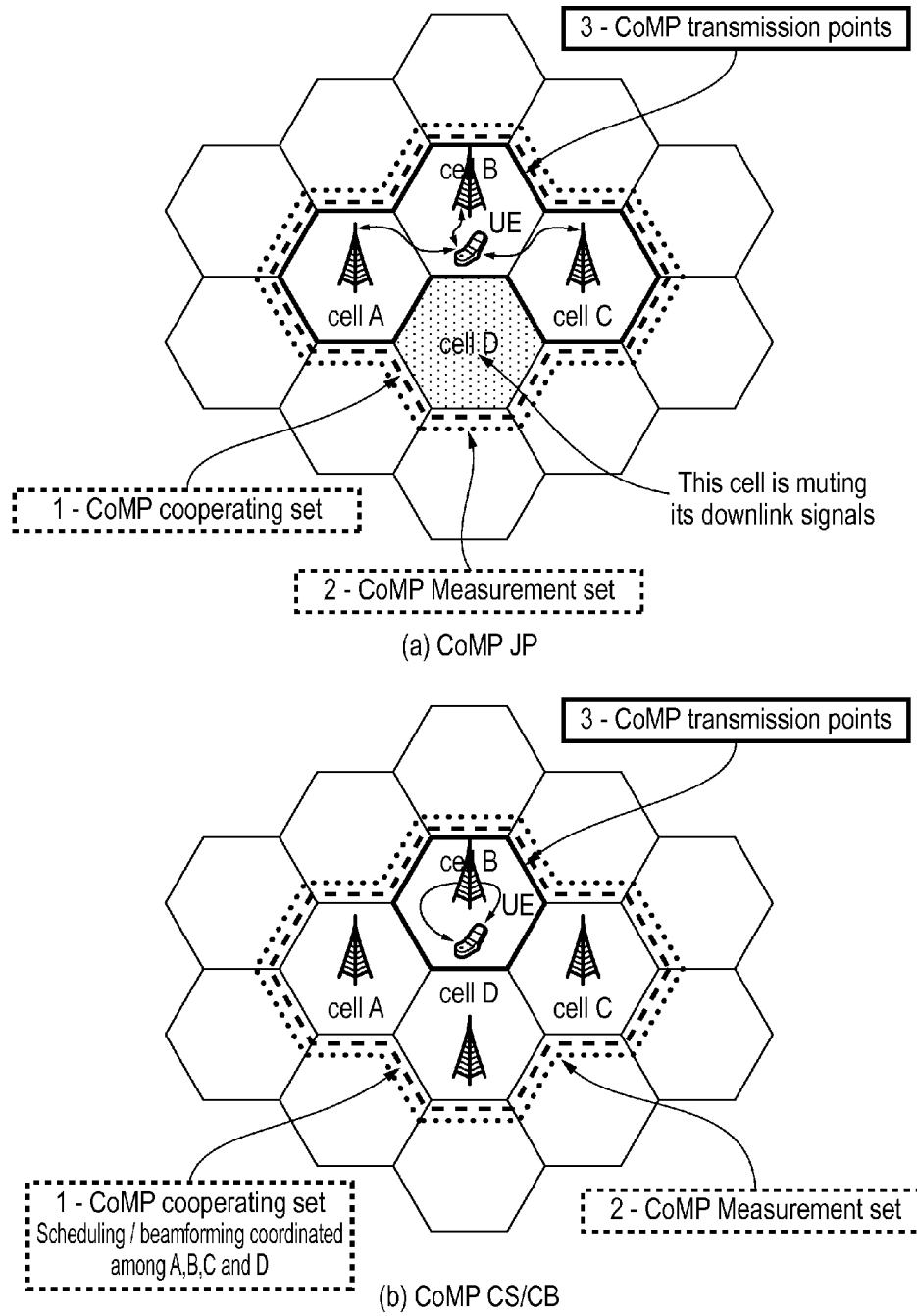
FIG. 8 illustrates principles employed in Co-operative Multipoint Processing (CoMP)

Before describing embodiments of the present invention, some further discussion will be given in relation to the control channel PDCCH in LTE. However, it is to be noted that the present invention is not restricted to application to PDCCH, or to LTE.

Potential Approaches to Transmit PDCCH from Multiple Cells

As already mentioned, it would be advantageous to be able to jointly transmit the same PDCCH message from two (or more) cells. Before describing embodiments of the present invention, some potential solutions will first be considered.

Within the scope of potential improvements to LTE (i.e. LTE-Advanced), possible, but non-preferred, approaches to solving the problem are:
(i) To transmit PDCCHs from two different cells with identical message contents, but not necessarily with any other special measures to ensure successful reception. It would then be up to the UE to combine the two signals if necessary to help with successfully decoding the message.

For example, the UE could attempt to decode each signal separately and then combined together. This might be feasible but there would be at least the following issues to deal with:—

- The UE would need to be aware of the possibility that two cells were transmitting PDCCH with the same contents. This could be indicated by RRC signalling.
- The UE would need to be aware of a restricted relationship between the search space locations used by the two cells (e.g. the same location used in both cells), otherwise the number of blind decoding attempts could become prohibitive.
- Ideally there would be some way for the UE to separate signals from the two cells, such as using multiple receive antennas to resolve the spatial separation between the cell sites. This would be more difficult for cells transmitted from the same site.
- The sets of CRS from the two cells would both need to be received by the UE, at least in the case where combining the signals was necessary to receive the PDCCH.

(ii) To transmit part of the PDCCH message from each cell (e.g. half the bits from each cell). The UE would typically need to receive both parts to decode the complete message. Additionally, the same issues apply as for approach (i) just mentioned. However, a variation of this idea is used in embodiments of the present invention to be described.

(iii) To use a new design of control channel, for example, using resources normally allocated on the uplink for PUSCH. This would require additional specification work; however, an already designed control channel for relay applications (R-PDCCH) might be suitable.

(iv) To have the same CRS locations in each co-operating cell. This might allow joint transmission of a reference signal for demodulation of a joint PDCCH. However, it could cause problems for legacy UEs attempting to receive CRS from only one cell. In addition, the current LTE specifications apply different sequences to CRS from different cells. In order to have identical sequences, the cell IDs would need to be the same, which would make it difficult for a UE to distinguish the two cells. There would also be other problems, unless it is intended that the two co-operating cells are actually to be considered as the same cell.

Principles Used in Embodiments of the Present Invention

Embodiments of the present invention are based on the recognition that co-operative transmission can be achieved for at least part of control channel information by arranging some time/frequency domain resources which are common between otherwise identical control channel messages transmitted from the two cells. In addition, for flexible operation of the invention when appropriate, signalling is required to inform the UE in the event that joint control channel transmission is used.

Some principles underlying embodiments of the present invention (not all of which are necessarily applied at the same time) are to provide a joint reference signal for reception of a joint transmission from two cells, to create a new cell from co-operating cells, and to provide a jointly-transmitted channel. The jointly-transmitted channel is not necessarily a control channel; however, embodiments of the present invention are particularly advantageous when applied to control channels such as the PDCCH of LTE.

These principles will now be described in more detail.

In order to provide a jointly transmitted control channel such as PDCCH, under the assumption that the control channel regions of the two cells are aligned, the cells co-operate in transmitting a new format of PDCCH message to the UE by transmitting identical information only in resources which would be common to a PDCCH message if it were to transmitted in by both cells according to an existing format (i.e. LTE Release 8/9).

Here, by "the control channel regions of the two cells are aligned", it is meant (or at least preferred) that the frame timings should be the same in each case. In order that there are sufficient common REs, some restrictions are preferably applied:—

(a) System bandwidth is the same in both cells.
(b) PDCCH duration is the same in both cells (preferably 2 or 3 OFDM symbols, as will be apparent from later discussion).

In addition in order to maximize the number of common REs it is desirable that:—

(c) The number of REs reserved for CRS is the same in both cells. This is achieved if there are either 1 or 2 antenna ports in both cells, or 4 antenna ports in both cells. Preferably there would be either 1 or 2 antenna ports (and this is assumed for subsequent discussion).
(d) PHICH duration is the same in both cells (preferably 1 OFDM symbol).

Under these assumptions, the following observations can be made:

- Both cells have the same number of "non-PDCCH REs" in the first OFDM symbol (henceforth it will be assumed that the symbols are numbered from 1, so that "first symbol=symbol 1")
- Both cells have the same PDCCH structure in OFDM symbols 2 and 3 (assuming only 1/2 antenna ports)
- Therefore the REGs (and REs) used for PDCCHs from each cell should be the same in OFDM symbols 2 and 3
- There may be some REs in common in the first OFDM symbol.

Some possible solutions for transmitting PDCCH from two co-operating cells based on the invention are as follows:

(1) PDCCH is transmitted only the REGs in OFDM symbols 2 and 3

A side effect is less inter-cell interference in OFDM symbol 1 for CRS, PCFICH, PHICH, existing PDCCH transmissions.

(2) As for (1) but additionally use the common REs in OFDM symbol 1 (i.e. REs appearing in both PDCCHs according to Rel 8)

This might lead to more complex data mapping if individual REs need to be considered rather than REGs.

(3) Transmit the PDCCH according to Rel 8 from a first cell (e.g. the Pcell), but only transmit in common REGs/REs from the second cell. Note that this version of the invention does not require a new format for PDCCH. Here, it is only necessary for one cell to transmit the "complete" PDCCH.

Since the number of REGs/REs actually available might vary from sub-frame to sub-frame, the data mapping would need to take this into account. Fortunately the necessary information is known at both UE and eNodeB.

The phase reference for receiving a joint transmission from two cells should be derived from reference symbols from both cells, to allow for slightly different arrival timings of the information from each cell. This is discussed here for the simple case of a single antenna or antenna port used for control channel transmission (i.e. one set of CRS per cell) in each cell.

An appropriate approach for PDCCH is to derive the phase reference from the CRS from both cells. This may be in the form of a linear combination of the channel estimates derived from the different CRS (e.g. with coefficients such as $(1, 1)$, $(1, -1)$, $(1, j)$ or $(1, -j)$). In general the coefficients (combining weights) need to be pre-determined and applied at least to pairs of CRS. The coefficients may be fixed, or signalled to the UE or vary from RB to RB in a predetermined way. A phase reference derived in this way requires that the UE knows which cells are co-operating, so that it can combine the correct CRS. This can be done by RRC signalling.

First Embodiment

In a first embodiment based on LTE, the network operates using FDD and comprises a single eNodeB controlling more than one downlink cell, each downlink cell having a corresponding uplink cell. Each DL cell may serve one or more terminals (UEs) which may receive and decode signals transmitted in that cell. In order to schedule the appropriate use of transmission resources in time, frequency and spatial domains for transmission to and from the UEs, the eNodeBs send control channel messages (PDCCH) to the UEs as already mentioned.

A PDCCH message typically indicates whether the data transmission will be in the uplink (using PUSCH) or downlink (using PDSCH), it also indicates the transmission resources, and other information such as transmission mode and data rate. To begin with, the UE performs blind decoding for a number of possible PDCCH messages over a defined search space on the downlink primary cell (Pcell), henceforth referred to as "the first cell". The amplitude/phase reference or references for demodulation of PDCCH from the Pcell is derived directly from the reference symbols (CRS) transmitted by the first cell. As an example of using the invention, if an eNodeB identifies (e.g. via RRM measurements or CSI reports) that a UE that it is serving is suffering from interference from another cell controlled by the same eNodeB, the joint-PDCCH transmission technique of the invention (such as version (3) above) is activated.

The eNodeB signals to the UE (e.g. via RRC signalling) that it should start to receive joint control channel transmissions from a particular additional cell, henceforth referred to as "the second cell". For example, the cell generating the interference will become the second cell). For receiving PDCCH REs which are transmitted by both first and second cells, the UE then derives an additional phase reference from a predefined linear combination of channel estimates made using the CRS from the first cell and the second cell. In a blind decoding attempt to receive a particular PDDCH from the first cell, the UE uses this additional phase reference for symbols which are transmitted in resource elements common to the PDDCH from the first cell and an otherwise identical PDCCH from the second, co-operating cell. The UE may avoid using CRS of either of the first or second cell which collide with REs of a PDCCH from the other cell. The UE may also avoid receiving PDCCH REs which collide with CRS from the other cell. Since channel coding is applied to the PDCCH, some REs can be lost or ignored without major problems.

In a preferred version of the first embodiment the first and second cells have the same system bandwidth, the same number of OFDM symbols for PDCCH, the same number of antenna ports for CRS, and the same PHICH duration. In one example of this preferred embodiment, the number of OFDM symbols for PDCCH is 3, the number of CRS antenna ports is 1 or 2 and the PHICH duration is 1 symbol.

In another version of the first embodiment, the combination of signals from two co-operating cells form a third cell. This third cell may be given a distinct cell ID. As well as an amplitude and/or phase reference for demodulation of a control channel such as PDCCH, the third cell may also provide at least one combined amplitude and/or phase reference signal for demodulation of data transmitted by the co-operating cells such as the PDSCH. For example, this may be an amplitude/phase reference for at least one antenna port derived from a combination (e.g., linear combination) of cell-specific or common reference signals (CRS) received from the two co-operating cells, or an amplitude/phase reference derived from UE-specific or dedicated reference signals (DM-RS) received from the two co-operating cells. In this version of the embodiment, the CQI feedback may be calculated using the channel measurements derived using a suitable reference; this can be achieved by using a combination of measurements on different CSI-RS received from the co-operating cells, or alternatively the co-operating cells may jointly transmit CSI-RS in the same resources.

Figure 9C:
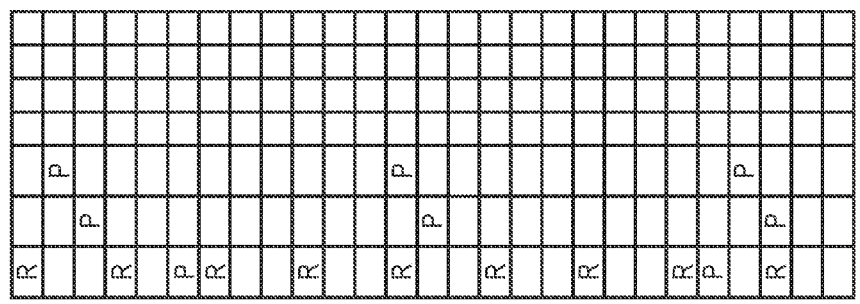
FIGS. 9A, 9B and 9C show the principle of the present invention applied to each of three cells respectively.
Figure 9B:
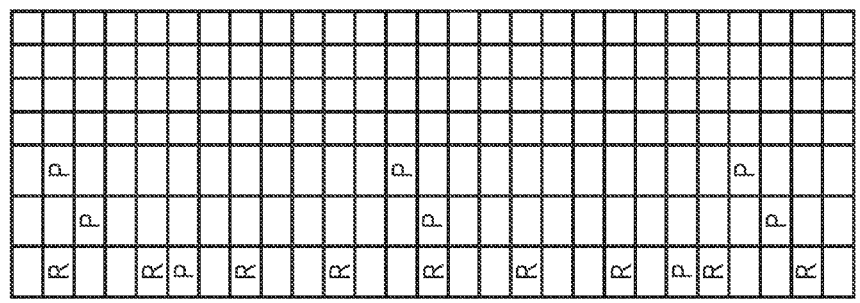
Figure 9A:
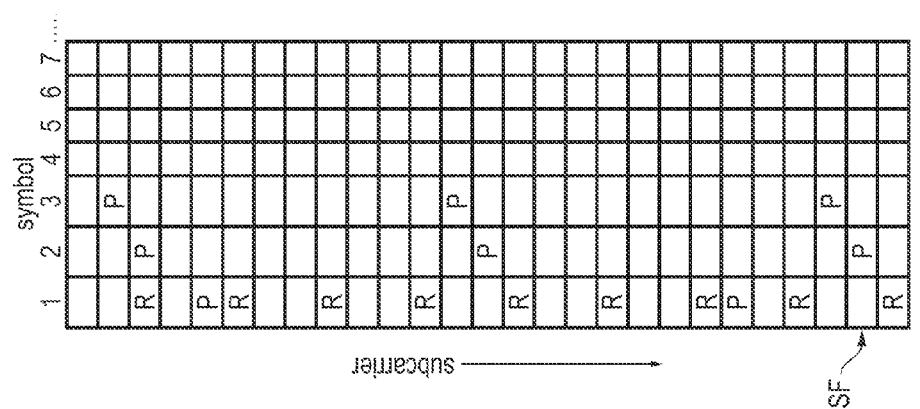
Figure 9A:
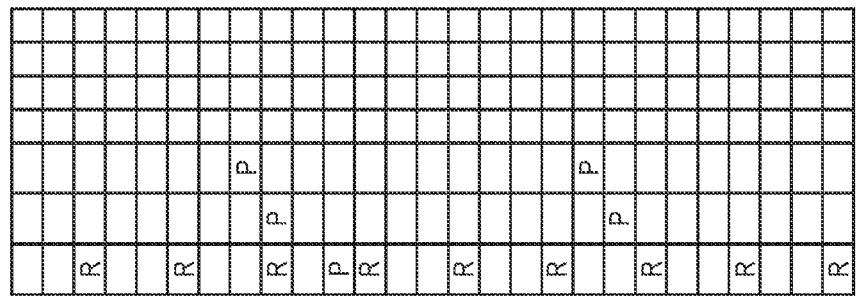
Figure 9B:
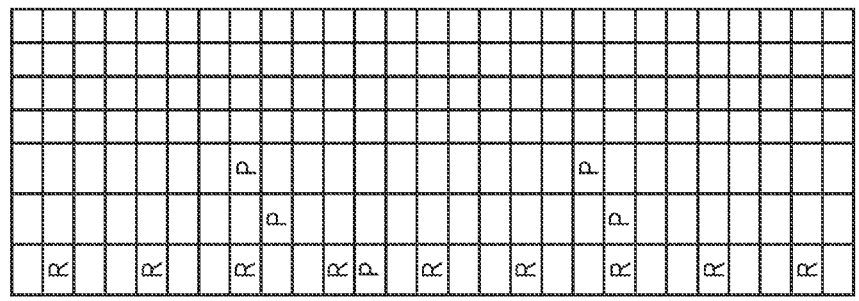
Figure 9C:
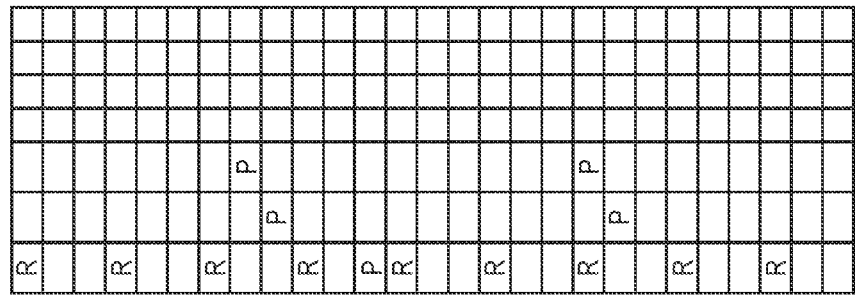

FIGS. 9A, 9B and 9C depict one example (to illustrate the principle only for a system like LTE) of co-ordination of PDCCH transmissions between cells, showing the OFDM symbols in the first resource block of a sub-frame SF for each of three different cells respectively. As in the previous Figures, along the horizontal axis are shown OFDM symbols 1, 2, 3, . . . with the subcarriers arranged along the vertical axis. The first 3 OFDM symbols may contain CRS (marked R) and PDCCH (marked P). In this example, the PDCCH allocation is shown to individual REs. In LTE the allocation would be to REGs, i.e. groups of four REs.

One PDCCH, intended to be identical for each cell, is shown. Normally, PDCCHs in different cells are intended to be received by different UEs, each served by one of the cells. The PDCCH's may be fully identical if two UEs in different cells had the same ID. Otherwise they may be identical except for the UE-specific CRC scrambling mentioned in the introduction. Only part of the frequency domain is shown in the Figure, and only the presence of CRS is considered here (no PCFICH or PHICH). The CRS have different locations in each cell, and the allocation shown assumes 2 antenna ports.

Figure 10B:
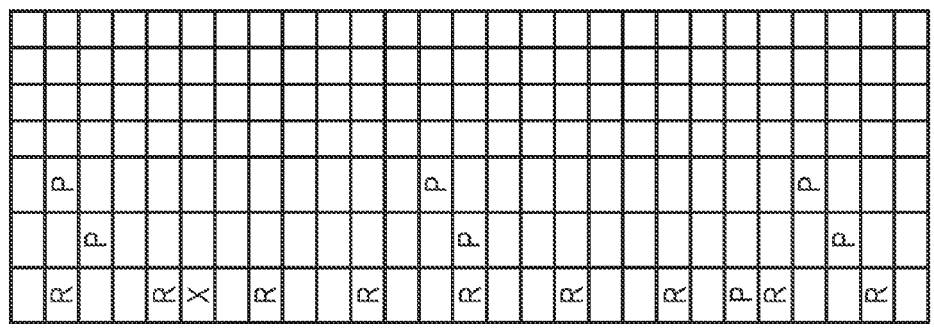
FIGS. 10A and 10B show an embodiment of the present invention applied to each of two cells respectively.
Figure 10A:
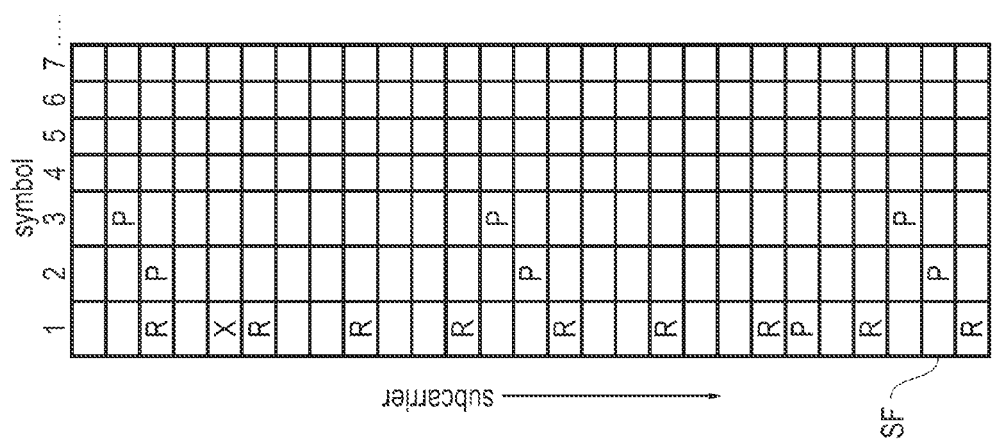
Figure 10A:
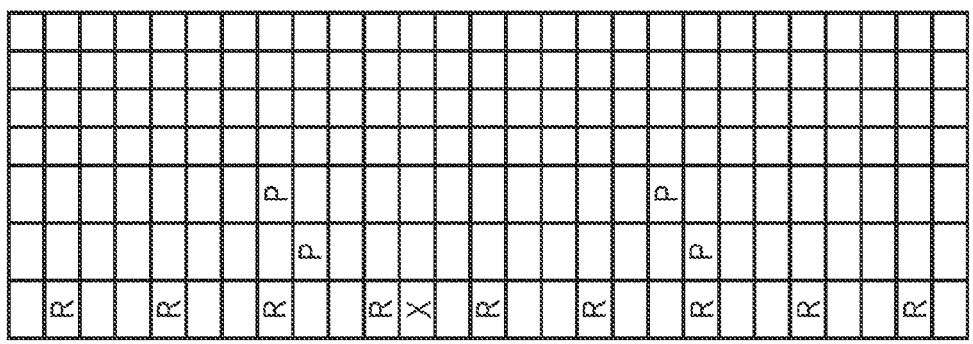
Figure 10B:
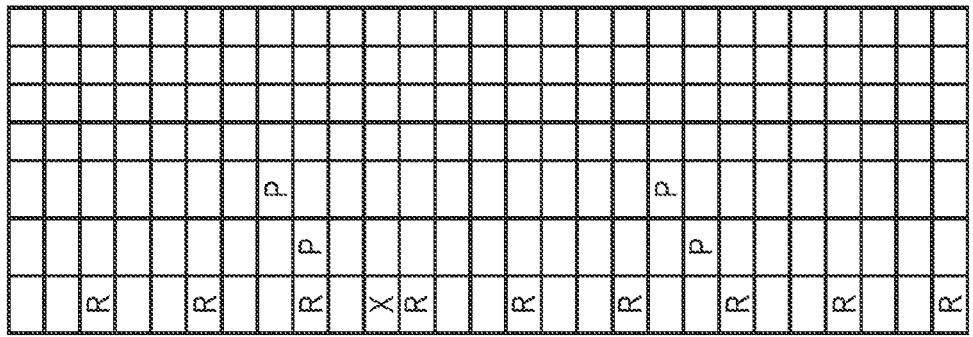

FIGS. 10A and 10B depict an example similar to FIGS. 9A, 9B and 9C, where the first embodiment of the invention is applied. In this case, resource allocation for the first few symbols of one sub-frame SF is illustrated for each of two cells. The first, Pcell is FIG. 10A and the second, cooperating cell is FIG. 10B.

According to the first embodiment, the phase reference for the PDCCH may be derived from CRS from both first and second cells, except for REs indicated by "X", where interference between CRS and PDCCH is likely. In this example, the PDCCH allocation is shown to individual REs. In LTE the allocation would be to REGs, i.e. groups of four REs as already mentioned.

In a variation (joint-PDCCH transmission version (2) above) of the first embodiment, a PDCCH is only transmitted in REs which are common between the PDCCH from the Pcell and the PDDCH from the co-operating cell. In other words, to enable a UE to combine the PDCCHs of different cells, the eNodeB ceases transmitting PDCCH in non-common REs.

In a further variation, transmission is only in common REGs.

The resource mapping of the PDCCH takes into account the available REs. In this variation, there is no transmission in the PDCCH REs marked "X" in FIGS. 10A and 10B (for either or both cells). In a further variation (version (1) above) of this embodiment, a PDCCH is only transmitted in OFDM symbols where all the REs of the PDCCH from the Pcell are in the same locations as the REs of the PDDCH from the co-operating cell. This may result in the PDCCH being transmitted only in symbols 2 and 3, depending on the system configuration.

Second Embodiment

The second embodiment is like the first embodiment except that the co-operating cells are not controlled by the same eNodeB. The co-operating eNodeBs exchange messages (e.g. via the fixed network) to co-ordinate the operation of the invention (e.g. to agree contents of a PDCCH message and the location that it should be transmitted in the search space).

As already mentioned the eNodeBs are mutually connected via a backhaul network (e.g., core network). There needs to be some communication between eNodeBs to ensure that the correct portion of the data to be transmitted to the UE is delivered to the appropriate eNodeB. The data could be the same for both eNodeBs. There also needs to be some communication between eNodeBs to agree details such as the timing, transmission mode and transmission resources for the data (to be sent using PDSCH), and contents and format of the PDCCH message. In LTE the scheduling of downlink data is performed by the network, so the main trigger for signalling between eNodeBs could be arrival of data from the core network at the radio access network for the UE.

However, some of the details of PDSCH and PDCCH formats could be agreed in advance.

Modifications—Multiple Antenna Ports

The above description has been mainly on the basis of assumption of a single antenna (or antenna port) used for control channel transmission in each of the co-operating cells. However, the present invention is also applicable in the case of more antenna ports per cell (e.g. 2 or 4). In the case of more antenna ports (where phase references can be derived for each of the antenna ports from their respective sets of CRS) transmit diversity schemes such as SFBC (Space-Frequency Block Coding) or STBC (Space-Time Block Coding) can be applied as already mentioned.

Typical transit diversity techniques require different signals to be sent from each transmit antenna and channel information on the radio path from each transmit antenna to be available at the receiver. Precoding or beamforming could also be used, although this normally requires information on the channel matrix being available at the eNodeB. Another technique, Single Frequency Network (SFN) can be considered as a special case of precoding for transmissions from spatially separated sites. Typically, in SFN the same signal is synchronously transmitted from the different sites (but with no particular precoding, so no channel information is needed). This can be done with one, and in principle, more than one antenna per site, applying transmit diversity techniques as may be required.

The present invention embraces two possible approaches for using the invention with multiple antennas:—
(a) Use additional antennas from co-operating cells in the same way as additional antennas from the same cell.

In this case, for LTE, 1Tx antenna per cell allows transmit diversity with 2Tx antennas for two co-operating cells. In other words two cells with one Tx antenna each can co-operate to use a transmit diversity scheme based on 2 Tx antennas. Thus two 2Tx antennas, each from different cells, can be used in a similar way to 2 Tx antennas, both in a single cell.

2Tx antennas per cell allows transmit diversity with 4Tx antennas for two co-operating cells. In this case the CRS from the different cells are considered independently and used as phase references for their respective antenna ports.
(b) Transmit identical signals from the co-operating cells (at least for part of the PDCCH message). This is equivalent to using an SFN between the co-operating cells (including Tx diversity if the system is so configured). In this case, a phase reference (or more than one, as necessary) is derived by combining references derived from CRS in different cells.

Other Modifications

Additional possible variations include the following:—
(c) Extension to more than two co-operating cells, for example, by adding further additional cells. Practically speaking, extension to more than three cells may be difficult owing to the reduced amount of common space for PDCCH. Most of the benefit is likely to be obtained using a co-operative transmission from two cells, even if the possibility of co-operation between more cells is configured (e.g. the three cells in FIGS. 9A, 9B and 9C).
(d) The principle of the invention can be applied to PHICH, so that the same PHICH indication to a UE is transmitted by more than one cell using common resources. Although PHICH occupies less resources than PDCCH, this could still be worthwhile to improve robustness of the PHICH transmission.
(e) The present invention may be applied to both PDCCH and PHICH simultaneously (on the other hand, the invention is less suitable for use with PCFICH: as the exact signal depends on the cell ID there is less scope to transmit the same signal from more than one cell).
(f) In a further modification, an eNodeB refrains from transmitting control channel signals in REs which would interfere with the CRS from the other co-operating cell. In other words, in addition to governing transmission in common REs, the present invention may be extended to cover what an eNodeB may transmit in other REs in at least one of the cells. This could be applied by the first or second cell or both (assuming two cells). For example in FIG. 10B, there is no transmission in the REs marked "X".
(g) Another possibility is to provide reference symbols embedded in the PDCCH message (i.e. known data values). Such reference symbols could be transmitted jointly by the co-operating cells. This would avoid the need for the UE to use the CRS, and/or possibly dispense with the need for the eNodeB to issue the CRS in the first place. However, the present invention is most clearly applicable when CRS or similar signals are present, leading to the difficulties explained earlier.
(h) The invention may also be applied to carrier aggregation, by implementing it at more than one carrier frequency.
(i) Use of any technique in accordance with the invention, for example that PDCCH is transmitted by two cells but not transmitted in REs which are not common between cells, and the appropriate treatment of reference symbols from multiple cells, may be fixed in a given system, or configured permanently for all UEs. However, this approach is not preferred as it is wasteful of resources, use of the invention not always being necessary for a given UE. Therefore, the possibility of signalling use of the invention to the network is preferable. Such signalling, for example, may be a semi-static configuration via RRC or dynamic via PDCCH, and include the cells for which it is to be applied. A signalling message may comprise at least one or more of:
   Pcell (first cell) ID, if not already configured
   Second cell ID
   Cell ID of any other co-operating cell
   Information relating to reference signals from one or more of the co-operating cells; depending on the embodiment this information may relate to CRS for PDCCH and/or PDSCH, or CSI-RS for PDSCH Cell ID of a new cell formed by the co-operating cells. Such a cell ID may be used to imply other properties of the new cell, such as transmission details of PDSCH Information relating to reference signals from the new cell (e.g., locations and sequence)

Instructions on how to derive a new phase reference (e.g. combining weights to be applied at the UE for CRS or other reference signals from different cells).

(j) It is possible to apply the invention to TDD. Although the above explanation has referred to a FDD-based downlink, the principle would apply equally in the case of TDD.

Thus, to summarise, an embodiment of the present invention may provide a joint amplitude/phase reference, a new cell from two co-operating cells, and/or a scheme for transmission of a channel such as a control channel from multiple cells and/or multiple fixed network nodes (eNodeB) to a mobile terminal (UE) in an LTE-Advanced system.

The current specifications for LTE do not provide for deriving a phase reference for reception of a joint transmission from two cells or creation of a new cell from two co-operating cells, or co-operative transmission of channels from more than one cell, and in particular are not directly compatible with co-operative transmission of a control channel from two different cells at the same frequency. This aspect of the invention is based on the recognition that co-operative transmission can be achieved for at least part of the control channel information by arranging some time/frequency domain resources which are common between otherwise identical control channel messages transmitted from the two cells. In addition, for flexible operation of the invention when appropriate, signalling is required to inform the UE in the event that joint control channel transmission is used.

In other words, embodiments of the present invention involve provision of signalling for the configuration of a mobile station to use additional control channel signals from another cell where at least part of the signal is identical to that from the first cell.

The features in the different embodiments above may be combined in the same embodiment. Moreover, various modifications are possible within the scope of the present invention.

Whilst the above description has been made with respect to LTE and LTE-A, the present invention may have application to other kinds of wireless communication system also. Accordingly, references in the claims to "user equipment" are intended to cover any kind of subscriber station, mobile terminal and the like and are not restricted to the UE of LTE.

In any of the aspects or embodiments of the invention described above, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein.

A computer program embodying the invention may be stored on a computer-readable medium, or it may, for example, be in the form of a signal such as a downloadable data signal provided from an Internet website, or it may be in any other form.

It is to be clearly understood that various changes and/or modifications may be made to the particular embodiments just described without departing from the scope of the claims.

INDUSTRIAL APPLICABILITY

Currently in LTE, each channel such as a control channel (PDCCH) is transmitted to the UE from one serving cell (the primary cell or Pcell). At the cell border the Pcell suffers from increased interference from neighbouring cells and typically a lower effective transmission rate is used to increase robustness to interference, for both data and control channel. Also, neighbouring cells are typically given different cell IDs, which can be used as a basis for distinguishing transmissions from different cells, even if radio frames are time-aligned. An embodiment of the invention modifies the control channel operation by arranging a common mapping of transmitted symbols to control channel resources in two different cells so that the same control channel message (or part of the message) can be transmitted jointly from the two cells. This can be used to improve control channel reception at the cell border, without using more control channel resources. This is beneficial in both normal system operation and also for Co-operative Multi-Point (CoMP) operation (e.g. using joint transmission techniques for data).

The invention claimed is:

1. A wireless communication method in a user equipment the method comprising:
   receiving downlink signals from at least first and second cells, said downlink signals comprising:
   respective reference signals transmitted from each of the cells; and
   a channel jointly transmitted by the cells wherein the jointly transmitted channel includes at least one control channel or part of a control channel the cells providing the jointly transmitted channel by transmitting identical information; and
   demodulating by the user equipment the jointly transmitted channel by utilizing a joint amplitude and/or phase reference derived from the respective reference signals.

2. The wireless communication method according to claim 1 wherein the jointly transmitted channel is transmitted by the cells using only resources which would be used in common by both cells if said channel were to be transmitted individually by both cells.

3. The wireless communication method according to claim 1 for use in an LTE-based wireless communication system and in which said at least one control channel is a Physical Downlink Control Channel, (PDCCH) and/or a Physical Hybrid-ARQ Indicator Channel, (PHICH).

4. The wireless communication method according to claim 1 wherein each of the respective reference signals is associated with a respective one of the cells, and a combination of the reference signals from more than one cell, defines a new cell.

5. The wireless communication method according to claim 4 wherein each of the cells and the new cell have different cell identities.

6. The wireless communication method according to claim 1 wherein the jointly transmitted channel includes a data channel.

7. The wireless communication method according to claim 1 wherein at least one of the cells has multiple associated antenna ports, and each reference signal associated with that cell is transmitted from one of said antenna ports.

8. The wireless communication method according to claim 1 wherein the downlink signals transmitted from one of the first and second cells are arranged so as to avoid interfering with the reference signals of the other of the first and second cells.

9. The wireless communication method according to claim 1 wherein cells are provided by base station equipment and the first and second cells are provided by the same base station equipment.

10. The wireless communication method according to claim 1 wherein the first and second cells are provided by respective base station equipment, the method further comprising exchanging signaling between the respective base station equipment to co-ordinate the jointly transmitted channel.

11. The wireless communication method according to claim 1 further comprising, prior to transmission of the jointly transmitted channel, signaling to the user equipment information about the jointly transmitted channel.

12. The method of claim 1 embodied in a non-transitory computer-readable recording media storing computer-readable instructions which, when executed by a processor of a transceiver device in a wireless communication system, cause the device to execute the method.

13. The wireless communication method according to claim 1 wherein the user equipment employs a joint phase reference derived from the respective reference signals for blind decoding of the jointly-transmitted channel.

14. A base station equipment configured to provide at least one of first and second cells, the base station comprising:
   memory; and
   a processor configured to cause transmission of a downlink signal including respective reference signals transmitted from each of the first and second cells, and a channel jointly transmitted by the first and second cells, wherein the jointly transmitted channel includes at least one control channel or part of a control channel, the cells providing the jointly transmitted channel by transmitting identical information, and wherein
   user equipment utilizes a joint amplitude and/or phase reference derived from the respective reference signals to demodulate the jointly transmitted channel.

15. A user equipment for use in a wireless communication system including at least one of first and second cells, the user equipment comprising:
   a receiver configured to receive transmission of a downlink signal including respective reference signals transmitted from each of the first and second cells, and a channel jointly transmitted by the first and second cells wherein the jointly transmitted channel includes at least one control channel or part of a control channel, the cells providing the jointly transmitted channel by transmitting identical information; and
   a demodulator configured to demodulate the jointly transmitted channel by utilizing a joint amplitude and/or phase reference derived from the respective reference signals to demodulate.

16. A wireless communication system comprising:
at least one user equipment; and
at least one base station equipment controlling first and second cells, the base station equipment arranged such that respective reference signals are transmitted from each of the cells, and at least one channel is jointly transmitted by the cells wherein the jointly transmitted channel includes at least one control channel or part of a control channel, the cells providing the jointly transmitted channel by transmitting identical information; and
wherein the user equipment is arranged to demodulate the jointly transmitted channel by utilizing a joint amplitude and/or phase reference derived from the respective reference signals.

* * * * *